Jan. 8, 1963 E. R. BERNSON ET AL 3,072,220
DISC-TYPE BRAKE WITH VIBRATION ABSORBING MEANS
Filed March 31, 1960
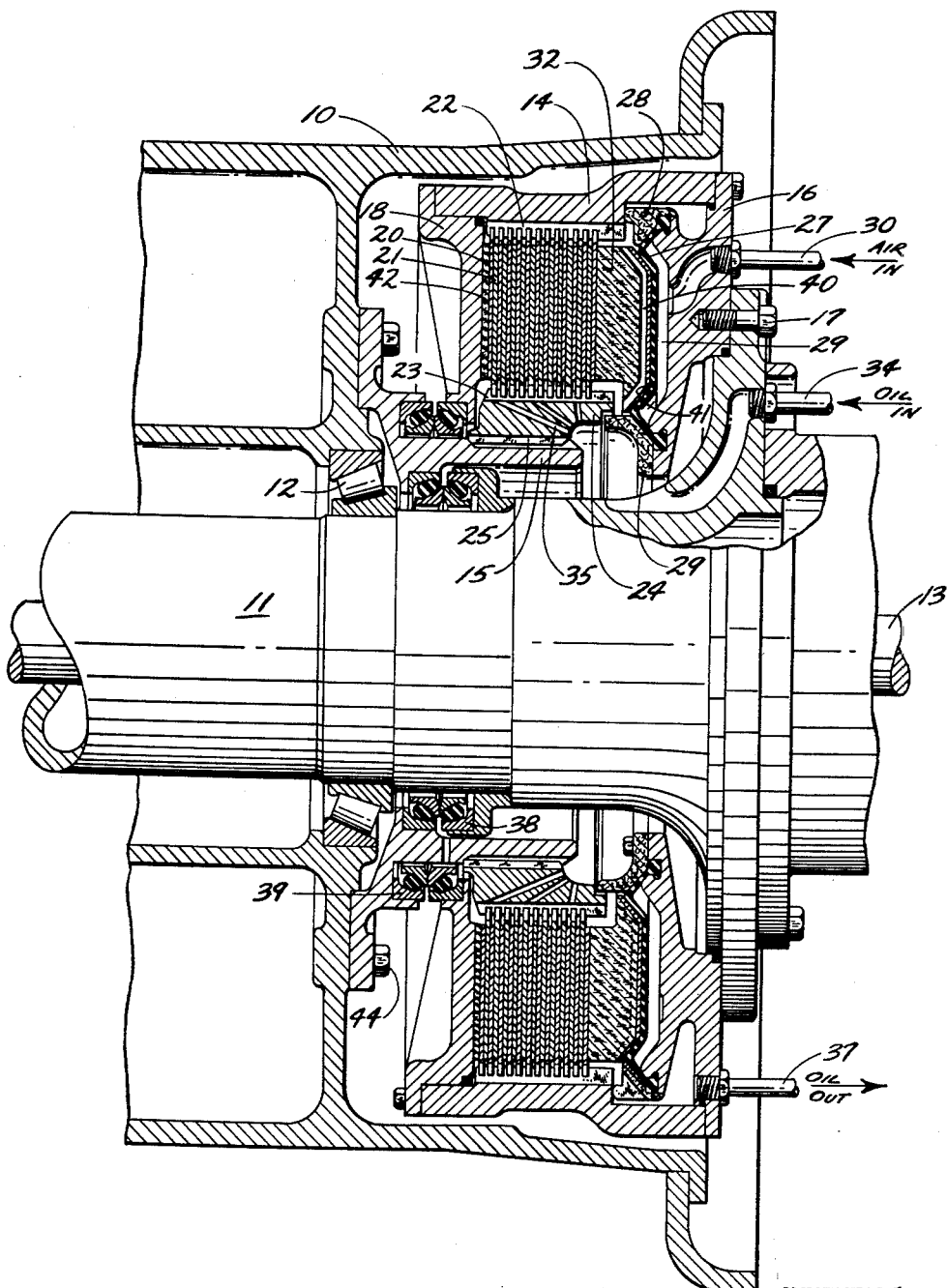
INVENTORS
ELMER R. BERNSON
MARVIN E. BEYERS
JOHN H. BABBITT Jr.
BY
Charles M. Fryer
ATTORNEY

United States Patent Office 3,072,220
Patented Jan. 8, 1963

3,072,220
DISC-TYPE BRAKE WITH VIBRATION ABSORBING MEANS
Elmer R. Bernson, Washington, and Marvin E. Beyers and John H. Babbitt, Jr., Peoria, Ill., assignors to Caterpillar Tractor Co., Peoria, Ill., a corporation of California
Filed Mar. 31, 1960, Ser. No. 19,110
1 Claim. (Cl. 188—72)

This invention relates to disc brakes of the oil cooled type and particularly to the suppression of high frequency vibration and its ill effects created by frictional contact of braking surfaces.

In heavy duty vehicles such as large trucks and tractors, the so-called squeaking of brakes presents a serious problem. Sound frequently heard when vehicle brakes are applied is recognized as resulting from a phenomenon sometimes referred to a "stick and slip." When two substances having a certain co-efficient of friction are in sliding contact they frequently stick and then slip alternately and at regular intervals creating vibrations of audible frequency. These vibrations when transmitted or telegraphed through vehicle parts such as axle housings and the like result in damage resulting from resonance or sympathetic vibrations and are undesirable because of the annoying sound created by them.

The co-efficient of friction between materials proven to be most desirable for friction brakes is such that high frequency vibrations are often produced when they are brought into sliding contact under pressure and efforts to eliminate such vibration including the use of special oils and the like have proven unsatisfactory and in some cases have resulted in reduced braking efficiency.

It is, therefore, the object of the present invention to provide a disc-type oil cooled vehicle brake in which vibrations set up in braking action are effectively damped and suppressed below the natural frequency of the other vehicle parts so that the brake is no longer capable of transmitting the vibrations of braking action to the surrounding structure.

Further and more specific objects and advantages of the present invention and the manner in which the invention is carried into practice are made apparent in the following specification wherein reference is made to the accompanying drawing.

The drawing is a central sectional view through a disc-type brake embodying the present invention showing a portion of the wheel and of the axle between which it functions.

The brake of the present invention is illustrated in the drawing as disposed between a wheel, a portion of which is shown at 10, and a non-rotatable axle housing 11 of the type used on a large truck or wheel-type tractor. The wheel is mounted for rotation on bearings, one of which is illustrated at 12 and another one of which, not shown, is disposed outwardly of the axle housing 11. A rotatable axle 13, within the housing 11, derives power from the engine of the vehicle in the usual way and may be geared through suitable reduction gearing, not shown, adjacent the outer side of the wheel. A disc-type brake is disposed between concentrically spaced annular walls 14 and 15, the wall 14 being the outermost and secured to a back plate 16 which is in turn secured to the stationary axle housing 11 as by cap screws 17. A front plate 18 is also secured against rotation to the outer wall 14.

A stack of annular friction discs shown at 20 and 21 are slidably but non-rotatably keyed to a ring of internal teeth 22 formed on the outer wall 14 and a ring of external teeth 23 formed on an internal anuular member 24 which has a splined connection 25 with the innner wall 15 for reasons presently to be set forth in detail.

Alternate discs in the stack are made of durable materials having a desirable co-efficient of friction such as sintered bronze and steel, one set of discs being connected with the outer wall and the alternately arranged discs of the other set being connected with the inner wall as is conventional practice in clutches and brakes of this type. A flexible diaphragm 27 is secured to the back plate 16 as by rings 28 and 29 preferably made of a heat insulating material such as synthane or an asbestos composition which protects the flexible diaphragm from the heat of friction resulting from the operation of the brake. The diaphragm 27 and back plate 16 form a chamber 29 for actuating air, from a suitable source under pressure, admitted through a tube 30 for applying the brake by compressing the stacks of discs 20 and 21 through a control plate 32.

Cooling oil from a suitable source under pressure is circulated through the brake, entering adjacent the inner periphery thereof through a pipe 34 and flowing outwardly in a generally radial direction through passages 35 in the member 24 to the inner periphery of the stack of discs 20 and 21. The discs are grooved or slotted as is general practice to permit the passage of this oil outwardly toward their outer peripheries but, since the particular configuration of the slots does not form a part of the present invention, they are not herein disclosed in detail. Having reached the outer periphery of the discs, the oil is free to pass outwardly through a discharge pipe 37, illustrated at the lower right hand portion of the drawing. Seals of a known type shown at 38 and 39 are disposed between the non-rotatable axle housing 11 and the wheel 10 to prevent the escape of the circulating cooling oil as well as to prevent the entry of foreign matter into the brake chamber.

The principal novelty of the present invention resides in the means employed to prevent vibration resulting from the stick and slip phenomenon, which takes place upon compression of the stack of discs 20 and 21 into braking contact, from being transmitted into resonant bodies such as the axle and wheel wherein they create undesirable sound and in some cases actual physical damage. To prevent transmission of such vibrations to the axle housing, the control ring 32 is formed of a resilient compressible material. While rubber or rubber-like material may be used for this purpose, a cellulose cork material is preferred because it is copressible and absorbs vibration efficiently without the undesirable rebound effect that is created in rubber-like materials. This resilient control ring is preferably bonded to the first brake disc 20 and also to a metal plate 41 which separates it from the diaphragm 27. Radially extending grooves 40 are formed in the surface of the control ring 32 before it is bonded to the plate 41 and form passageways for the circulation of cooling oil which further protects the diaphragm against the heat of friction. An annular disc 42 of the same material as the control ring 32 is preferably disposed between the outermost disc 20 and the front plate 18 of the clutch chamber although it could be positioned anywhere in the stack in place of one of the discs 20 in which case it would be bonded between a pair of the discs 21. With this arrangement, the vibrations which normally originate in the stack to be transmitted and amplified to the other parts of the vehicle are suppressed to a point where they can no longer excite harmful vibration in the surrounding structures. This phenomenon might be compared to a violin wherein the tight bow strings excite the violin strings at an audible frequency. If the bow strings are loosened, however, they cannot excite the violin strings to vibrate and no sound is produced which is comparable to the present application wherein ring 32 and disc 42 tend to soften the stack and prevent it from exciting the surrounding structure to audible or noticeable vibrations. It should also be noted that some type of spring means could be substituted for disc 4 to detune or change the frequency of the stack but such a device would not provide the additional damping provided by ring 3 and disc 4. An additional advantage of the use of cushioning material for the control ring 32 is that it brings even pressure to bear on the stack of brake disc insuring good frictional contact between them as well as a uniform rate of wear throughout their friction surfaces.

In order further to prevent vibrations originating in the stack of brake discs from being transmitted to the body of the wheel 10, the member 24 is splined, as previously described, to the inner wall 15 which is rigidly secured to the wheel 10 as by cap screws shown at 44. The splined connection 25 forms a driving connection between the member 24 and wheel 10 and at the same time, creates an effective barrier to the transmission of audible vibrations.

A further advantage of the intermediate member 24 is that it permits removal of the wheel 10 from the axle housing without disturbing the relationship of the stack of discs in the brake chamber since the member 24 with its external teeth 23 supports the discs in their operating positions when the wheel is removed. In other designs of the brakes the removal of the wheel, which is directly keyed to the stack of discs, permits misalignment of the discs and a temporary aligning member is required to hold them in position until air is applied to compress and retain them in position while the wheel is installed.

While the foregoing description is directed to disc-type brakes, it is equally well adapted to use in connection with disc-type clutches and other disc-type couplings to which its application is readily apparent.

We claim:

In a disc-type friction device comprising a stack of at least ten annular discs and in which rotating and non-rotating discs are alternately arranged whereby pressure applied from one end of the stack creates vibration exciting frictional engagement between a multiplicity of disc surfaces, the combination of a solid wall at the opposite end of the stack, and a cushioning member of relatively soft non-metallic compressible material having substantially the same annular configuration as the discs disposed between said solid wall and the adjacent end of the stack to be subjected to pressure applied to the discs to absorb vibration caused by the tendency of the discs to stick and slip at their abutting frictional faces.

References Cited in the file of this patent
UNITED STATES PATENTS

| | | |
|---|---|---|
| 1,872,547 | Zeder | Aug. 16, 1392 |
| 1,958,070 | Schmid et al. | May 8, 1934 |
| 2,214,762 | Eksergian | Sept. 17, 1940 |
| 2,535,763 | Tucker | Dec. 26, 1950 |
| 2,659,468 | Hobbs | Nov. 17, 1953 |
| 2,714,823 | Dall et al. | Aug. 9, 1955 |
| 2,773,655 | Mandolf | Dec. 11, 1956 |
| 2,888,103 | Armstrong | May 26, 1959 |
| 2,925,891 | Sanford | Feb. 23, 1960 |
| 2,928,504 | Hahn et al. | Mar. 15, 1960 |